United States Patent [15] 3,671,463
Colgan [45] June 20, 1972

[54] PROCESS FOR EXTRUDED CATALYST AND CATALYST SUPPORTS

[72] Inventor: Joseph Dennis Colgan, Stamford, Conn.

[73] Assignee: American Cyanamid Company, Stamford, Conn.

[22] Filed: Nov. 27, 1970

[21] Appl. No.: 93,403

[52] U.S. Cl. ............................................. 252/448, 252/451
[51] Int. Cl. ..................................... B01j 11/44, B01j 11/36
[58] Field of Search ............................................ 252/451, 448

[56] References Cited

UNITED STATES PATENTS 3,519,574  7/1970  Colgan .................................. 252/451
2,697,066  12/1954  Sieg ..................................... 252/451
2,875,159  2/1959  Erickson ............................... 252/448
2,929,792  3/1960  Arnold et al. ......................... 252/448

Primary Examiner—C. F. Dees
Attorney—William J. Van Loo

[57] ABSTRACT

A process for catalyst materials in extrudate form and at increased density by use of a mix mulling technique is disclosed wherein a high molecular weight, organic, water-soluble polymer is incorporated into the mix and results in increased density in the final formed catalyst at mulling times of 0–150 minutes.

10 Claims, No Drawings

PROCESS FOR EXTRUDED CATALYST AND CATALYST SUPPORTS

This invention relates to improvements in a process for obtaining extruded catalyst and catalyst supports. More particularly, this invention relates to a process for obtaining catalyst and catalyst supports wherein an aqueous slurry of a suitable xerogel is mix-mulled and then extruded.

Particle density of catalyst and catalyst supports is inversely related to total pore volume according to the following relationship:

$$d_p = d_s/1 + V_p d_s$$

wherein
$d_p$ = particle density, g./cc
$d_s$ = skeletal density, g./cc
$V_p$ = total pore volume, cc/g.

In a series of catalyst preparations employing the same xerogel and preparative method, the value of skeletal density will be the same and, accordingly, the value of particle density will vary inversely with total pore volume. Control of density, or total pore volume, in extruded catalyst is desirable for many reasons. High density extrudates may be desired to increase extrudate strength or to increase the weight of catalyst that can be charged to a catalytic reactor. On the other hand, low density extruded catalyst support material may be desired to facilitate subsequent impregnation with activating agents or to increase rates of diffusion of impregnants or reactants into the catalyst pores. The present invention, however, is concerned only with extruded catalyst or catalyst supports having a density of at least 0.7 grams per cubic centimeter.

Many methods have been proposed for controlling the density of extruded catalysts. One method used to manufacture high density material involves the preparation of high density powder which is subsequently made into a paste and then extruded. It is difficult, however, to form strong extrudates from dense powder since such powder is hard and nor readily compacted into a strong coherent extrudate. Low density, soft, friable powders are more readily extruded in paste form to yield strong extrudates. To achieve high density in extrudates prepared from low density powders, however, usually requires that the extruder feed paste be subjected to extensive mechanical working. Conventional equipment such as mix-mullers and pug mills are conveniently used for this purpose. In addition to the extensive times required for working the extruder feed paste to achieve increased density, the range of densities available is generally limited for a given extruder feed paste. Accordingly, there exists the need for improved processes or process improvements that enable a wide range of densities to be rapidly achieved in catalyst and catalyst supports obtained by extruding an extruder feed paste processed by mix-mulling.

According to the present invention there is provided a process for preparing formed catalyst material of a density of at least 0.7 grams per cubic centimeter from xerogels of a density of 0.6 grams per cubic centimeter or less which comprises: forming a mixture of water, xerogel of a suitable inorganic metal oxide, and a high molecular weight, organic, water-soluble polymer, the ratio of water to xerogel being sufficient to form an extrudable paste, the amount of polymer being from about 5 percent to about 40 percent, by weight, based on the weight of said xerogel, and the density of said xerogel being about 0.6 grams per cc. or less; mulling said mixture for a time period in the range of 0 to 150 minutes to provide a density of at least 0.7 grams per cc. in the final formed catalyst; extruding the densified mixture; and thereafter drying and calcining the extrudate.

The present process enables the time required for mulling to a desired density value to be reduced considerably and, in some cases, to be eliminated. The present process also enables the range of density values to be extended far above that conventionally obtainable while at the same time providing high mechanical strength in the formed catalyst materials throughout the range of density values obtainable. These results are highly surprising in view of the fact that prior use of polymers in catalyst preparations resulted in increased pore volume, reduced density, and reduced mechanical strength. The present process distinguishes from the prior processes with respect to the point of addition of polymer in processing and to the effects achieved thereby.

The term "catalyst materials" as employed herein refers to inorganic metal oxides including silica which are useful in catalyzing various reactions with or without various promoters added thereto at some time during their manufacture. The term "xerogel," as that term is intended, refers to a gel containing little or none of the dispersion medium used in preparing the gel.

Among the suitable inorganic metal oxides used in forming catalyst materials are included oxides such as silica, alumina, magnesia, zirconia and the like or their equivalents including mixtures thereof such as silica-alumina. The preparation of such suitable inorganic metal-oxides in hydrogel form is well known, and xerogels result from drying or partial drying of hydrogels.

Silica hydrogels may be prepared by precipitation from an alkali metal silicate using a material such as sulfuric acid under appropriate conditions of pH, temperature, agitation, etc. as is well known.

Alumina hydrogels may be prepared by precipitation of a water-soluble aluminum compound which may be either an aluminum salt, such as aluminum sulfate, aluminum nitrate, aluminum chloride and the like, or an alkali metal aluminate, such as sodium or potassium aluminate, or both. Thus, alumina hydrogels may be prepared as specifically modified by the procedures set forth in U. S. Pat. Nos. 3,032,514 and 3,086,845, among others.

Alumina coated hydrogels are formed by first preparing a silica hydrogel in accordance with the procedure given therefor and subsequently preparing an alumina hydrogel in lesser amount in the same preparative medium. The amount of alumina hydrogel present may constitute from about 5 to 40 percent, by weight, based on the total weight of silica-alumina. Higher amounts of alumina in the silica-alumina may be achieved by adding alumina slurry to silica-alumina slurry, if desired, preferably after washing of the hydrogels in the individual slurries.

After formation of the hydrogel, it is generally preferable to separate the hydrogel from excess medium, if necessary, and wash the separated gel to remove undesired ions which may be present. However, washing may be delayed until after the catalyst has been formed.

After the hydrogel has been formed, and preferably washed, it may, if desired be treated with promoters. The nature of promoters useful and methods for their incorporation within the catalyst material are well known. It is also possible to forego promoter incorporation at this point in the process and delay promoter incorporation until after the catalyst is formed, if promoter incorporation is to be considered. It is, of course, also possible to incorporate promoters at some point prior to hydrogel formation, in which case subsequent provision therefor may be obviated.

Regardless of whether or not provisions are made for washing and/or promoter incorporation, it is necessary to remove water from the hydrogel, i.e. to form a xerogel. Although it is generally preferable to subject the hydrogel, usually in the form of a filter cake, to a desired drying procedure it is also to be understood that hydrogels having higher water contents may also be subjected to drying to form xerogels. Higher water contents may arise in the hydrogels being subjected to drying in order to provide the proper fluidity for processing the hydrogel into the drying equipment employed or from incorporation of promoters, as well as for other reasons. The manner of drying and nature of drying equipment employed may vary widely in obtaining xerogels. It is generally preferable to employ spray drying as the technique for obtaining xerogels. However, a variety of other techniques are known and are suitable. Other drying procedures include, for example, rotary drying, tray drying, vacuum drying, belt drying, and the like. The extent to which drying is accomplished may vary widely depending on the particular hydrogel being dried and the nature and conditions of the drying technique employed. No special restrictions as to the state of dryness are placed upon the xerogels by the present process as long as the xerogels are within a specified range of density values and when in admixture with added water will form a paste consistency suitable for extrusion according to conventional procedures.

As previously indicated, selection of a xerogel for processing into strong coherent extrudates is limited to those which are in the form of soft, friable powders of limited density. Generally, the range of density values for useful xerogels will be from about 0.15 to 0.6 grams per cubic centimeter (cc.).

In carrying out the process of the present invention a mixture of a suitable xerogel, water, and polymer is prepared. The ratio of water to xerogel must be within the range conventionally employed in preparing extrudable pastes. The particular ratio will generally vary among the various xerogels useful, but generally the ratio will be between about 1/2 part to 3 parts of water per part of xerogel on a weight basis, preferably between about 1 and 2 parts of water per part of xerogel, same basis. Reference is made herein to low water and high water usages in preparing the xerogel mixtures. While variations arise due to the different nature of the various xerogels contemplated, low water usages are those where the ratio of water to xerogel is below about 1.5:1 and high water usages accordingly are in excess of this ratio.

The amount of polymer employed in forming the mixture may vary widely depending upon such variables as the nature of the polymer, especially molecular weight thereof, the nature of the selected xerogel, the ratio of water to xerogel employed, mixing or mulling conditions and duration, and the like. Generally polymer usage in the range of 5 to 40 percent, by weight based on the weight of xerogel, is useful and preferred amounts are from about 15 to 30 percent, same basis.

Among the high molecular, organic, water-soluble polymers that may be employed in the process of the present invention are included polyacrylamide, hydrolyzed polyacrylonitrile, polyvinyl pyrrolidone, polyvinyl alcohol, carboxymethyl cellulose, poly-(amine-epichlorohydrin condensates), and the like. Generally polymers having a molecular weight in the range of 100,000 or more are suitable. Preferably, polyacrylamides of molecular weight in the range of 3,000,000 to 5,000,000 or higher are employed. The useful polymers, as indicated, are water-soluble and such term is intended to cover both true solutions and colloidal solutions.

After the mixture described above has been prepared, the next step in processing is determined by the nature of the mixture formed and the specific requirements as to density of the final formed catalyst material. As indicated previously, it is generally desirable to obtain the formed catalyst material at a density value of about 0.7 grams per cc. or higher. It frequently happens by use of the polymer with xerogels at low water ratio that the mixture as formed, that is without any mulling, will yield catalyst material of density at least 0.7 grams per cc. and, accordingly, the requirement for mulling for such a density value is eliminated. However, where higher density values are desired, mulling is necessary even where the xerogel is at low water ratio. In other instances, regardless of the water ratio employed, it is necessary to mull the mixture to obtain a density value of 0.7 grams per cc. and higher, the density value generally increasing to a maximum value with increasing mull time. In accordance with the process of the present invention, the time for mulling to a particular density value will be substantially reduced from that required by prior art processes and the upper limit as to density values will be substantially larger than that obtainable by prior art processes. Thus, in carrying out the process of the present invention, the mulling time may vary from 0 minutes, i.e. no mulling required, to the maximum time normally employed in conventional processes depending upon the particular equipment employed. Generally, the highest practical time of mulling is about 150 minutes using equipment conventionally employed for such purpose, and thus the time range for mulling in the present process is 0 to 150 minutes, or until the desired density value is obtained in the final formed catalyst. It is to be noted that the mixture, whether mulled or not, does not yield information as to the value of density to be obtained in the final formed catalyst. However, by making use of the information given in the examples which follow, one can select a final density value and conditions of processing yielding such value. For information as to alternative catalyst materials, it is suggested that a series of runs, as in example 2, be made to establish final density values.

Following mulling when that step is employed or forming of mixture when mulling is not employed, the appropriate mixture is then extruded according to conventional procedures. Although any well known extrusion procedure can be employed, it is generally preferred to employ an auger type extruder fitted with an appropriate die plate. The extrudate obtained is normally in the form of strands which do not deform significantly under their own weight when laid on their lengthwise dimension.

After the extrudates have been formed, they are subjected to drying and calcination according to conventional procedures. Drying is generally at temperatures in the range of 150°–350° F. It is preferably carried out by staged drying techniques to minimize the production of fines. According to this technique, the total volatile content is removed in portions, each portion in a separate drying step, in contrast to a continuous drying operation wherein all of the volatiles are removed in a single step. It is generally preferred that an initial drying step or stage be conducted in such a manner as to double the initial solids content. One or more additional steps or stages may then be employed to remove remaining volatiles.

After drying, calcination is accomplished in conventional manner at temperatures up to about 1,100°–1,200° F. for time periods of up to about an hour, during which the metal oxides are activated and polymer burned off. After calcination, where necessary, the catalyst materials may be washed to remove undesirable ions and contaminants.

It is to be appreciated that the catalyst materials of the present invention may have promoters present, introduced in the catalyst slurry as previously described. Alternatively, the calcined extrudates may be impregnated therewith in accordance with procedures well-known to those skilled in the art. The presence of promoters in the hydrogel slurry does not significantly effect subsequent processing steps in the preparation of the catalyst materials of this invention.

The catalyst of the present invention may be used as cracking catalysts for fixed or moving beds. In addition, the catalyst materials may contain special promoters to provide formed catalyst useful for effecting particular reactions, such as isomerization, hydrogenation, reforming, hydrocracking, hydrodesulfurization of petroleum hydrocarbons and the like. The improvements in physical properties of the structured catalysts obtained by the process of the present invention are especially helpful in providing extra space for the promoters within the structured catalyst without significant loss of activity due to diminution of absorbency because of the presence of promoter. Additionally, the increased area provided in the catalyst materials of the present invention eminently qualifies them for use in those processes wherein dispersed solids are present in the participating reactants.

Depending upon the particular reaction involved, the nature of the promoter employed may vary widely. In certain cases metals and metal oxides, alone or in combination, are appropriate. The metals involved include Group I-B metals, such as copper, silver, and the like; Group V-B metals such as vanadium and the like; Group V-III metals, such as platinum, palladium, rhodium, nickel, cobalt, and the like; transition metal oxides of Group V-I metals such as chromium, molybdenum, tungsten, and the like; and others. Halogens are also promoters in certain instances, particularly chlorine and fluorine. As is well-known, promoters of the general type described above are present in the final catalyst composition in amounts to render them suitable for the particular end use contemplated. In general, a promoter or combination of promoters may constitute amounts of from about 0.01 to 20.0 percent by weight of the final catalyst composition.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

In the following examples reference is made to physical properties such as pore volume, surface area and the like. In general, these are determined in accordance with the procedures described in the booklet "Test Methods for Synthetic Fluid Cracking Catalyst," published by American Cyanamid Company, January, 1957, and widely distributed in the field. An additional test not given in this booklet is crush strength. This value is determined by placing an extrudate on its side between two parallel plates. Force is applied to the top plate by means of pneumatic pressure until the extrudate is crushed. The device is such that the air pressure in pounds to cause crushing is the crush strength of the extrudate.

EXAMPLE 1 - COMPARATIVE 1,230 gallons of decationized water was drawn into a 3,000 gallon strike tank and the temperature was adjusted to 90° F. A large diameter turbine agitator was set at 30 revolutions per minute. Addition of 242 gallons of 28% $Al_2O_3$ sodium aluminate solution (15% excess $Na_2O$) was started, adjusting the rate to 4 gallons per minute. Immediately thereafter, addition of 428 gallons of 7.6 percent aluminum sulfate solution was started at 8 gallons per minute. The alum solution flow rate was then further finely adjusted using an automatic pH controller to maintain the pH of the tank mixture at 7.5. Additions of both mixtures were continued at these approximate rates holding the mix pH at 7.5, for a period of 50 minutes, at which time the required volume of alum solution had been added. Alum flow was stopped; sodium aluminate flow was continued until the mix pH reached 10.6. The mixture was aged at pH 10.6 for 30 minutes and was then subjected to two stages of filtration and washing.

In the first filtration stage, the slurry was fed to a rotary vacuum filter where it was filtered and washed with decationized water. The first filter cake, containing up to 0.5% $Na_2O$ and 0.2% $SO_4$, dry basis, was repulped to 7–8% $Al_2O_3$ with decationized water. The pH of this slurry was adjusted to 7.5–8.0 by adding 40° Baume nitric acid at about 40 pounds real $HNO_3$ per ton of $Al_2O_3$. A second filtration-washing operation was then carried out to lower the sodium content of the cake to below 0.02 percent on $Al_2O_3$. Wash water for this filtration stage contained a small amount of electrolyte in order to maintain the high wash rate required for soda removal. This was accomplished by adding 0.05–0.1% $NH_3$ to decationized water. Washed slurry from the second filtration contained about 15% $Al_2O_3$.

To 1,282 pounds of dilute sodium silicate-water solution (5.85% $SiO_2$) at 80° F. was added 25% $H_2SO_4$ until the silica was gelled and was continued until the pH of the mix reached 4.0. To this mix 147 pounds of alum solution (6% $Al_2O_3$) was added followed by addition of sodium aluminate (28.5% $Al_2O_3$) to a mix pH of 5.0. The resulting slurry was filtered and washed three times to remove sodium sulfate. The washed slurry was 8 percent solids with a $SiO_2/Al_2O_3$ weight ratio of 3.0/1.0 in the solids.

Washed alumina slurry was mixed with washed silica-alumina slurry in a ratio of 100 parts of alumina slurry (15% $Al_2O_3$) of 94 parts silica-alumina slurry (8 percent solids). After intimate mixing, the mixed slurry was spray dried to produce a powder with a solids content of 78 percent, bulk density of 0.196 grams per cc., and a $Al_2O_3/SiO_2$ ratio of 3.0.

Sixteen pounds of xerogel described above was mixed with 26.9 pounds of water in a mix muller. Periodically small portions of the mix were removed and processed to calcined extrudates. To produce the extrudates the mix was fed to a conventional auger type extruder fitted with a die plate. The extruder converted the material into strands which were subsequently dried at 250° F. and then calcined at 950° F. to yield the extrudate product properties of the extrudates prepared at various mix mull times are shown in Table I.

EXAMPLE 2

This example illustrates the process of the present invention. Fifteen pounds of the xerogel described in Example 1 were mixed with 25.2 pounds of water and 3.45 pounds of polyacrylamide (molecular weight 3,000,000–5,000,000) in a mix muller. Periodically small portions of the mix were removed and processed to calcined extrudates as in Example 1. Properties of extrudates prepared at various mix mull times are also shown in Table I.

EXAMPLE 3 - COMPARATIVE

Fifteen pounds of xerogel described in Example 1 were mixed with 25.2 pounds of water in a mix muller. Periodically small portions of the mix were removed and processed to calcined extrudates following the procedure described in Example 1. Properties of extrudates prepared at various mix mull times are also shown in Table I.

EXAMPLE 4

This example illustrates the process of the present invention. Fifteen pounds of the xerogel described in Example 1 were mixed with 26.1 pounds of water and 3.45 pounds of polyacrylamide (molecular weight 3,000,000–5,000,000) in a mix muller. Periodically small portions of mix were removed and processed to calcined extrudates as in Example 1. Properties of extrudates prepared at various mix mull times are also given in Table I.

TABLE I

| | Example No. | | | |
|---|---|---|---|---|
| | 1 | 2 | 3 | 4 |
| $H_2O$/xerogel (lb./lb.) | 1.68 | 1.45 | 1.45 | 1.74 |
| PAM[1]/xerogel (lb./lb.) | 0 | 0.23 | 0 | 0.23 |
| PAM + $H_2O$/xerogel (lb./lb.) | 1.68 | 1.68 | 1.45 | 1.97 |
| | Extrudate Properties | | | |
| Zero Mull Time Density (gms./cc.) | 0.605 | 0.763 | 0.584 | 0.545 |
| CS/L[2] (lbs./in.) | 38 | 85 | 39 | 29 |
| | Extrudate Properties | | | |
| 30 Min. Mull Time Density | 0.647 | 0.882 | 0.640 | — |
| CS/L | 40 | 151 | 41 | — |
| 60 Min. Mull Time Density | — | 1.01 | — | — |
| CS/L | — | 178 | — | — |
| 90 Min. Mull Time Density | 0.697 | 1.15 | 0.676 | — |
| CS/L | 42 | 180 | 31 | — |
| 120 Min. Mull Time Density | — | 1.09 | — | — |
| CS/L | — | 207 | — | — |
| 150 Min. Mull Time Density | 0.745 | 1.06 | 0.722 | 0.927 |
| CS/L | 57 | 153 | 43 | 192 |

Notes: 1. PAM = Polyacrylamide
2. CS/L = Average Extrudate Crush Strength in lbs. Divided by Average Extrudate Length in Inches.

Table I shows that higher extrudate density and strength are more readily achieved by the method of this invention, Examples 2 and 4. Example 2 shows that at low water usage in xerogel-water mix, no mulling is required in the process of this invention to achieve a higher extrudate density than obtained after extensive mulling (150 minutes) by the prior art procedure. Both Examples 2 and 4 show the higher density values obtained by the process of this invention than by the prior art procedure.

I claim

1. A process for preparing formed catalyst material of increased density from low density xerogels which comprises:
   a. forming a mixture of water, a suitable inorganic metal oxide including silica and an organic water soluble polymer having a molecular weight of 100,000 or more, the ratio of water to xerogel being sufficient to form an extrudable paste, the amount of polymer being from about 5 to about 40 percent, by weight, based on the weight of said xerogel, and the density of said xerogel being 0.6 grams per cubic centimeter or less;
   b. mulling said mixture for a time period in the range of 0 to 150 minutes to provide a density of at least 0.7 grams per cubic centimeter in the final formed catalyst;
   c. extruding the densified mixture; and thereafter drying and calcining the extrudate.

2. The process of claim 1 wherein the polymer is a polyacrylamide of molecular weight in the range of 3,000,000 to 5,000,000.

3. The process of claim 2 wherein the ratio of water to xerogel is 1.45:1 and a mulling time of zero minutes is employed.

4. The process of claim 2 wherein the ratio of water to xerogel is 1.45:1 and a mulling time in excess of 0 minutes is employed.

5. The process of claim 2 wherein the polyacrylamide is employed at 23 percent, by weight, based on the weight of said xerogel.

6. The process of claim 1 wherein the ratio of water to xerogel is from 0.5 to 3.0 parts per part of xerogel.

7. The process of claim 1 wherein the ratio of water to xerogel is from 1 to 2 parts per part of xerogel.

8. The process of claim 1 wherein the density of the xerogel is from 0.15 to 0.6 grams per cubic centimeter.

9. The process of claim 4 wherein the mulling time is 90 minutes.

10. The process of claim 2 wherein the ratio of water to xerogel is 1.74:1 and the mulling time is 150 minutes.

* * * * *